United States Patent Office 3,257,781
Patented June 28, 1966

3,257,781
GAS CHROMATOGRAPHY APPARATUS
Frederick J. Debbrecht and Charles B. Euston, Wilmington, Del., James M. Kauss, Dallas, Tex., and Aaron J. Martin, Heemstede, Netherlands, assignors, by mesne assignments, to Hewlett-Packard Company, Palo Alto, Calif., a corporation of California
Filed Sept. 10, 1962, Ser. No. 222,491
4 Claims. (Cl. 55—197)

The present invention relates to gas chromatography in general, and in particular to a continuous gas chromatographic apparatus therefor particularly adapted for use in the field of preparative scale gas chromatography.

Gas chromatography, as is presently practiced, according to one customary procedure involves the elution of a gas mixture or sample into its components by methods, which are commonly referred to in the art today, as "elution partition separation" and "elution absorption separation." In "elution partition separation," a small sample of a mixture to be separated and analyzed is injected into one end of a narrow column packed with inert, granular, solid particles which support a liquid fixed phase or solvent in the form of a thin film or coating which had been previously deposited upon the inert particles. This liquid fixed phase or solvent is usually a high boiling organic liquid and is commonly referred to as the partitioning liquid. Subsequently, the column is eluted with an inert carrier gas such as helium. Components of the volatile mixture are partitioned between a moving gas phase in the vapor space between the solid particles and a stationary liquid phase absorbed in the liquid coating of the granular particles. This causes the components of the mixture to move through the partitioning media within the column at individual velocities less than that of the carrier gas. The velocity at which each component moves is dependent upon its partition coefficient, the latter being a measure of the solubility of the component in the liquid fixed phase. Since different compounds have different partition coefficients, the components of the mixture move through the column at different speeds and, if the column is long enough, the components of the mixture emerge from the opposite end of the column one by one, usually in the order of their boiling points. In "elution absorption separation," the column is packed with an absorptive material, such as silica gel, and the sample carrying gas is passed through as in "elution partition separation." Separation is achieved as a result of the varying adsorbability of the components of a mixture on the same adsorbent. The emerging components of both methods are then detected by any suitable means for detecting vapor concentration in a gas stream. Thus, differences in thermal conductivity, ionization potential or density between incoming or outgoing gas may be utilized in connection with a recording potentiometer to plot the potentiometer deflection against time, thereby providing both a quantitative and a qualitative analysis of the components of the mixture.

While gas chromatography is a useful analytical tool that provides rapid, accurate analyses of complex mixtures of volatile materials in a simple and inexpensive fashion, there are several distinct disadvantages inherent in the use of these chromatographic techniques and the apparatus associated with these techniques. The most serious drawback relates to the fact that conventional chromatographs are limited to either a manual or automatic batch-type procedure, wherein the separation of one sample must be completed before another can be started. Another serious disadvantage resides in the fact that the sample handling capacity and throughput of various conventional apparatus available today are such that they cannot be employed for preparative scale work.

Accordingly, it is an object of this invention to provide a continuous chromatographic method and apparatus.

A further object of this invention resides in the provision of a novel, continuous chromatographic technique and apparatus therefor which is suitable for both analytical and preparative-scale applications.

Yet another object of this invention resides in the provision of a novel, chromatographic method and apparatus therefor characterized by greater resolving power and increased throughout of material for separation.

Briefly, the present invention is characterized by features of a novel method and apparatus therefor whereby the chromatographic column or receptacle is rotated in such a manner that sample introduction, separation and collection of the constituents of a sample all occur simultaneously, thereby affording remarkable increases in sample handling capacity. This is accomplished by an apparatus comprising receptacle means, inlet means supplying a sample of fluid to be separated to the receptacle means, means to introduce a carrier gas to the receptacle means, outlet means from the receptacle, means for delivering constituents of the gas sample and the carrier gas, and means operatively connected to the receptacle means for continuously rotating the same whereby the fluid mixture is continuously separated.

It is believed that a better understanding of the various embodiments of the invention will be gained by referring to the following detailed explanation of the same taken in conjunction with the drawings in which.

Figure 1:
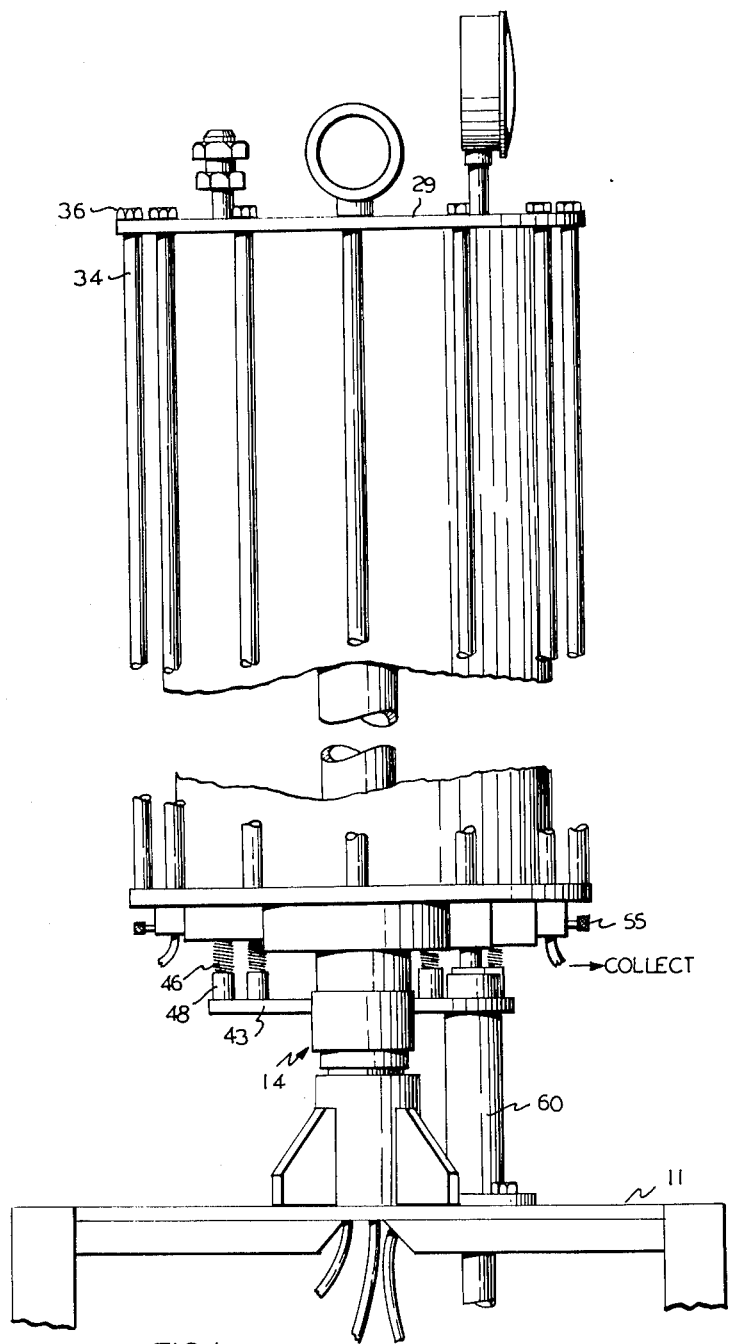
FIG. 1 is a front elevational view of the apparatus of the invention.
Figure 2:
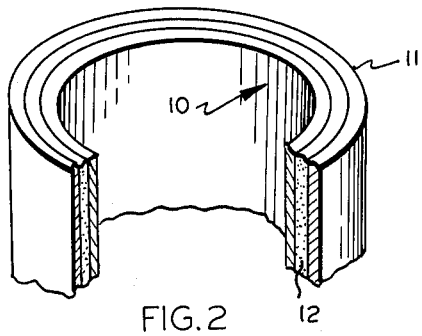
FIG. 2 is a fragmentary sectional view of an embodiment of the receptacle means in the form of an annular space between the walls of the two concentric cylinders packed with inert material for the chromatographic separation.
Figure 3:
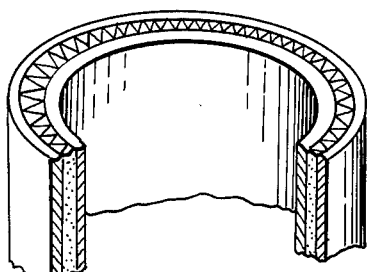
FIG. 3 is a fragmentary sectional view of another embodiment of the invention wherein the receptacle means is illustrated as a honeycomb network packed with inert material.
Figure 5:
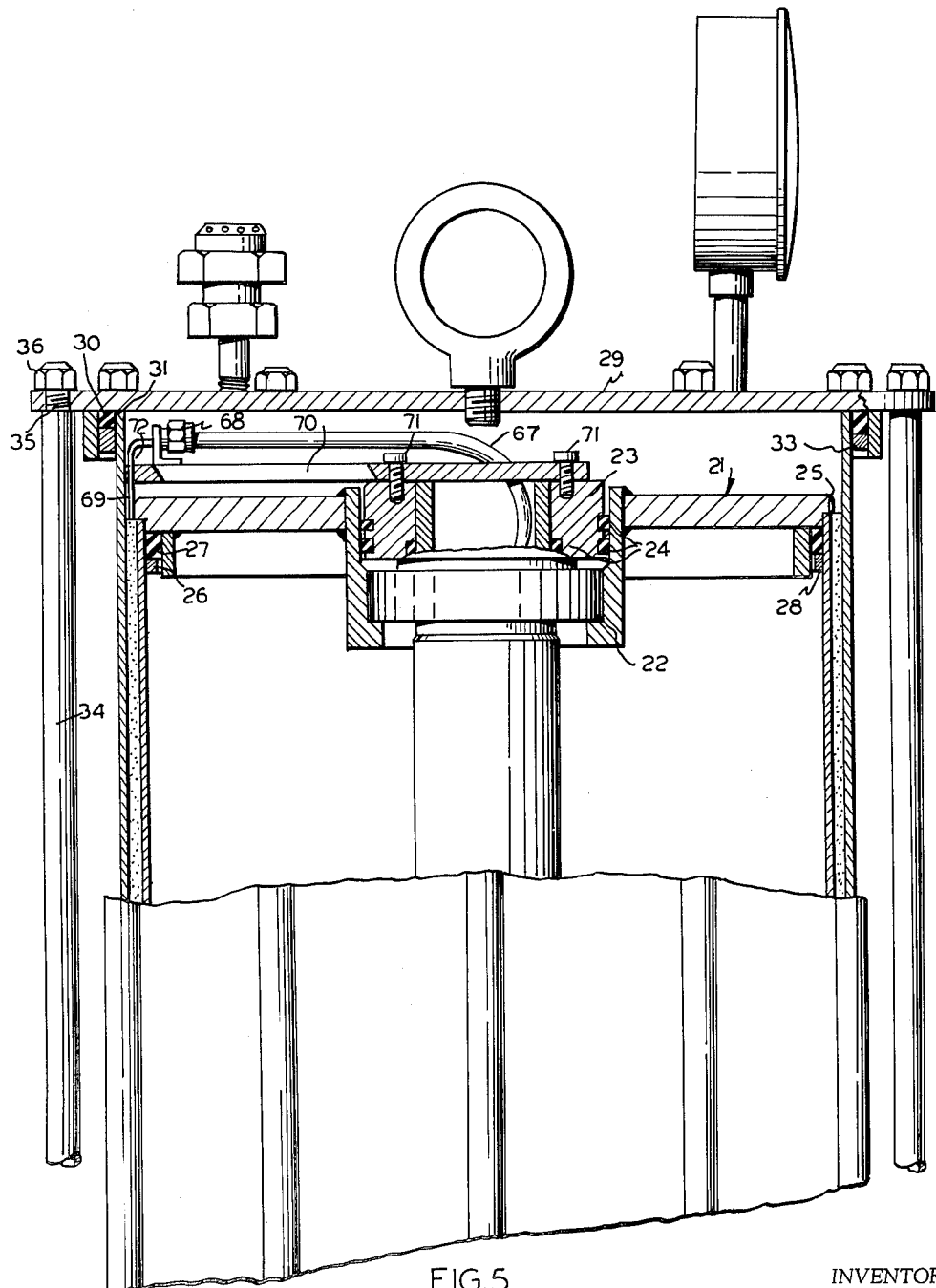
FIG. 5 is an enlarged sectional view illustrating in detail the top half of the assembly of FIG. 1
Figure 6:
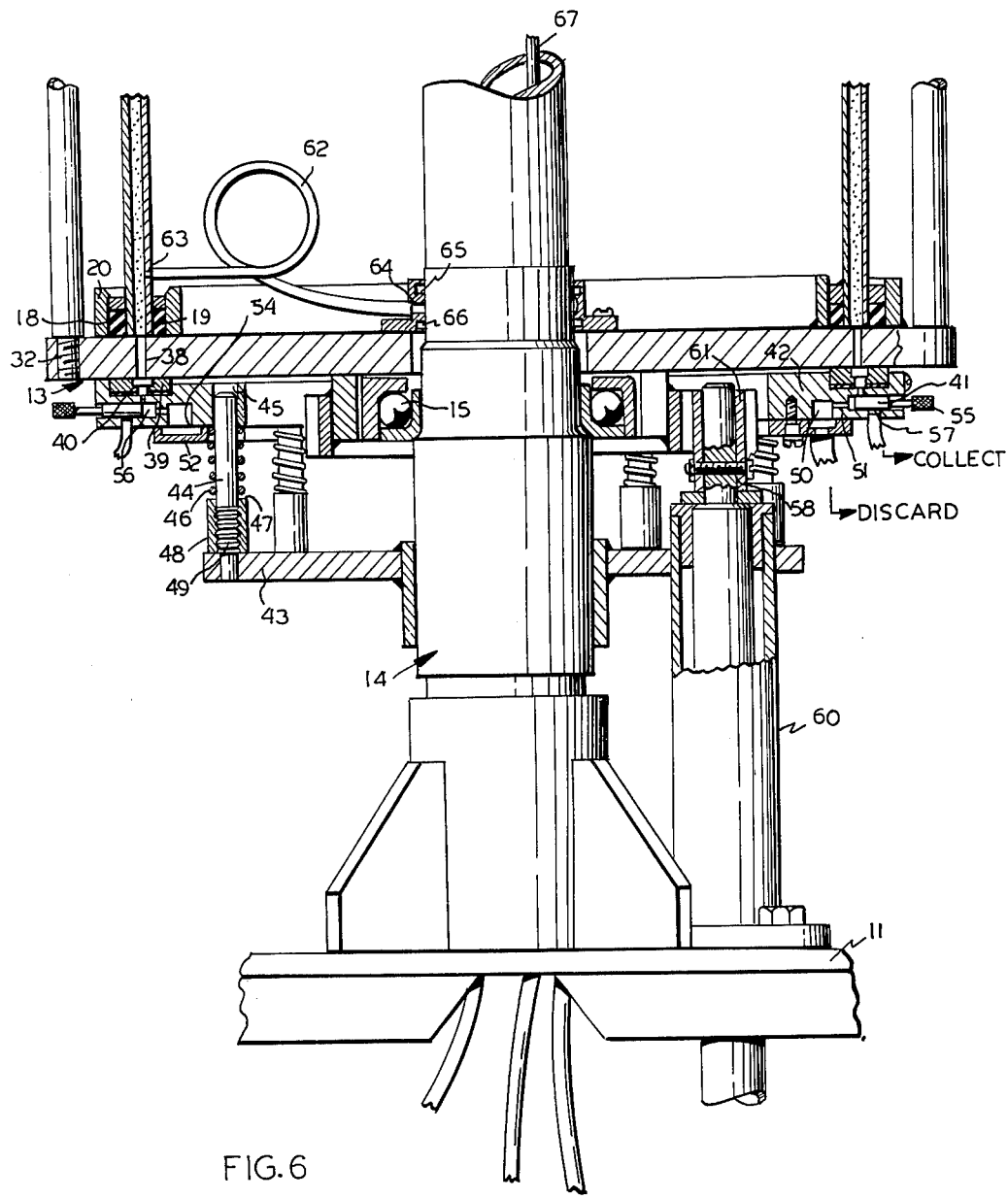
FIG. 6 is an enlarged sectional view illustrating in detail the lower half of the assembly of FIG. 1.

As illustrated in FIGS. 5 and 6, one of the preferred embodiments of the present invention comprises an assembly which includes the rotatable column inner shell 10 and the rotatable column outer shell 11 defining an annular channel 12 extending near the periphery of rotatable column base 13, thus defining one end of said annular channel which is illustrated in FIG. 2 or alternately the base plate is mounted onto a stationary column spindle 14 at one end thereof and is supported by the ball bearing honeycomb network of FIG. 3. The rotatable column 15 press fitted into the stationary column spindle. Gastight seals, in the form of "O" shaped rings are disposed between the outer opposed faces of the inner and outer column shells respectively and the inner lip of the column base plate as indicated at 18 and 19. The "O" shaped rings are retained in position by oppositely disposed annular rings shown in cross-section as projections 20 so as to form a channel which seats the "O" shaped rings.

Directly above the rotatable column base plate is rotatable inner shell cap 21 which is vertically aligned with the rotatable column base plate and mounted on the stationary column spindle, at the other end thereof, by means of a ball bearing 22 which is press fitted thereto. A gland nut 23 is threadably engaged with the column spindle to act as a positioning device for the ball bearing. A gas-tight relationship is provided in the form of "O" shaped rings 24 mounted on the outer and inner faces of the gland nut. The inner "O" shaped ring provides a gas-tight seal between the gland nut and the column spindle while the outer "O" shaped rings provide a gas tight rotary seal between the gland nut which is stationary and the inner shell cap which is rotary. The periphery of the rotatable inner shell cap rests on face of the column inner shell as indicated at 25. A gas-tight relationship is provided in the form of an "O" shaped ring 26 mounted adjacent the outer face of the column inner shell and the inner face of the inner shell cap at the point of engagement as indicated at 27. The "O" shaped ring is retained in position by an L-shaped projection which depends downwardly from the inner face of the inner shell cap in such a manner that the foot of the L is adjacent the inner face of the inner column shell as indicated at 28.

Directly above the rotatable inner shell cap is a rotatable head plate 29 which is in touching engagement with the surface of rotatable column outer shell. A gas-tight seal is provided in the form of an "O" shaped ring 30 mounted adjacent the outer face of the outer column shell and the inner face of the head plate at their point of engagement 31. The "O" shaped ring is retained in position by an L-shaped projection 32 which depends downwardly from the inner face of the head plate in such a manner that the foot of the L is adjacent the outer face of the outer column shell as indicated at 33.

Thus, the head plate and inner cap cooperate with the outer and inner column shells at one end thereof with other ends of said inner and outer column shells and column base plate to define the extent of the annular channel.

The head plate is slidably mounted on the rods 34 which extend through holes 35 circumferentially located near the periphery of the head plate. The ends of the tie rods which extend through the holes in the head plate are preferably threaded and adapted to receive nuts 36 in threadable engagement therewith. The opposite ends of the tie rods threadably engage tap holes 37 provided circumferentially in the column base plate around the periphery thereof which are in substantially vertical alignment with the holes extending through the head plate.

Within and located circumferentially along the periphery of the rotatable column base plate are a series of outlet ports 38 which extend therethrough and communicate from one end of the annular channel defined by the inner and outer column shells to a stationary seal 39 which is contiguous with the lower face of the column base plate. Within and located in vertical alignment with said outlet ports, in said stationary seal, are communicating channels 40 with the diameter of a portion of each channel exceeding that of the outlet ports and communicating between the outlet ports of the rotatable column base and two-way valves 41 located in stationary seal plate 42 which is located therebelow.

Located between the stationary seal plate and the pedestal is positioning pins plate 43 mounted on the column spindle by means of set screws (not illustrated) which holds the stationary seal plate stationary and urges it upwardly against the lower surface of the rotatable column base plate through the action of positioning pins 44 which are adapted to fit in complementary seats 45 of stationary seal plate. The positioning pins are spring loaded by spring 46 seated on spring thrust washers 47. The compression of the springs on the positioning pin is accomplished by spring compressor nuts 48 which are threadably engaged with stud 49 directly below and in vertical alignment with the positioning pin and the spring. Thus, the spring compressor nuts can be turned upwards to compress the springs and urge the stationary seal plate into sealing engagement with the stationary seal.

An exhaust manifold 50 is provided in the bottom face of the stationary seal plate in form of an annular channel located adjacent the valve channel and in communicating engagement therewith through exhaust passage 51. Attached to the exhaust manifold is the exhaust manifold sealing disc 52 which is attached thereto by means of screws 53. A gas-tight seal is provided for the exhaust manifold sealing disc by means of "O" shaped rings and indicated at 54.

The two-way valves located in the stationary seal plate each contain a valve spool 55 slidably engageable within the valve channel 56, which communicates which the exhaust manifold by means of the exhaust passage and collection port 57 located therebelow.

The valve spool when pushed in, provides a communicating passage between outlet ports and the collection ports for the collection of desired sample. When the valve spool is pulled outwardly the collection port is sealed and the outlet ports communicate with the exhaust manifold by means of the exhaust passage to allow sample to be discarded.

Located below and attached to the rotatable column base plate is a gear 58 which provides the rotary motion to all of the rotatable parts of the drive assembly. The power from the motor means (not illustrated) is transmitted from the drive pinion shaft 59 through the pinion shaft post 60 and transmitted to the column base plate by means of the pinion 61 and the gear.

An aliquot collection tube 62 is connected at one end to the column inner shell as shown at 63. The other end of the collection tube is connected to the column spindle as indicated at 64. A gas-tight seal is provided in the form of two shaped rings 65 and 66 to maintain a rotary seal between the aliquot collection tube and the column spindle.

Within the column spindle, suitable tubing is provided to connect the aliquot collection tube downwardly through a seal (not shown) provided with suitable gas-tight fittings to a detector. Similarly, carrier gas and sample material are introduced into the apparatus through fittings provided in the seal in the column spindle.

Means are provided for introducing a sample into the column packaging material via sample delivery tube 67 which is connected at one end thereof to one of the gas-tight fittings provided in the seal within the column spindle. The sample delivery tube extends upwardly and within the column spindle from the gas-tight fitting in the seal to a fitting 68 in which is mounted a sample jet 69 in the form of a 16-gauge stainless steel hypodermic tube which depends downwardly over the column packing material. The sample jet is preferably supported by a rigid jet support arm 70 which is connected at one end thereof to the gland nut via bolts 71 whereas the other end thereof is positioned over the column packing material and is provided with an access hole 72 adapted to receive the stainless steel hypodermic tube and thus maintain the same at the level of the column packing material.

Figure 4:
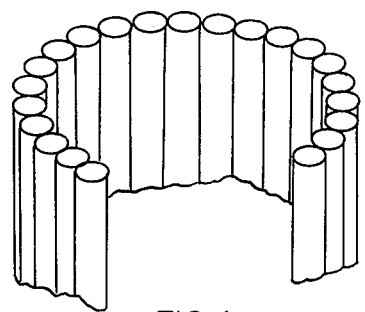
FIG. 4 is a fragmentary sectional view of another embodiment of the receptacle means wherein the means is in the form of a series of tubes packed with inert material.
Figure 7:
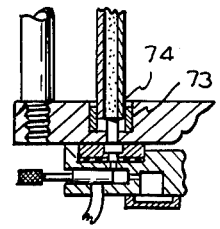
FIG. 7 is a fragmentary view of a modification of the invention.
Figure 8:
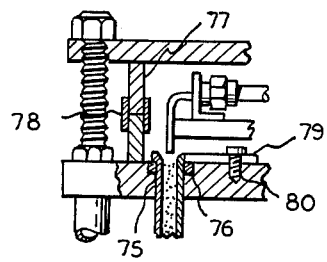
FIG. 8 is a fragmentary view of another modification of the invention.

With regard to the embodiments of the invention illustrated in FIGS. 4, 7 and 8, there is illustrated an annular column in the form of a series of tubes each packed separately and independently with inert packing material. When a bundle of tubes is utilized instead of the annular column of FIG. 2 or the annular honeycomb network of FIG. 3 modifications of the column base plate are utilized as illustrated in FIG. 7 wherein each tube, preferably made of stainless steel and of one-quarter inch inside diameter, is mounted in the column base plate by providing the required number of receptacles 73 to receive them. A gas-tight seal is provided in the form of "O" shaped rings as indicated at 74.

The tubes of the bundle are mounted in the inner cap plate in holes provided therein as indicated at 75. The gas-tight seal is maintained by the provision of "O" shaped rings as indicated at 76.

The head plate is suitably provided with a circumferentially disposed downwardly projecting flange 77 which depends and is complementary with circumferentially disposed channel 78 adapted to receive said flange and in substantially vertical alignment therewith.

Preferably, but not necessarily, there is provided a tube bundle sealing disc 79 which seats and seals the upper ends of the tubes along the circumferences thereof and is attached to the inner cap plate as indicated at 80.

The aliquot collection system employed with the modification illustrated in FIG. 4 is the same with the exception that the aliquot collection tube is attached to only one of the columns or tubes in the inner bundle in the same manner as provided with respect to FIG. 2.

Support for the column packing material is provided by screening material (not illustrated) located between the bottom surface of the column area and column base plate. In the modifications of the column illustrated in FIGS. 2 and 3 the screening material is preferably, but not necessarily, in the form of an annular or doughnut shape and adapted to fit over the lower end of the annular channel defined by the column inner and outer shells. In the case where a tube bundle is employed as a column, as illustrated in FIG. 4, a porous metal material can be swaged into the bottom of each tube to prevent the column packing material from flowing into the outlet ports and into the collection valves.

In the operation of the apparatus of the invention, a vaporized sample is delivered through the sample delivery tube and delivered to the stationary sample jet or inlet which is positioned at the inlet end of a rotating receptacle in the form of an annular chamber. During its rotation, the receptacle cuts across or moves transversely the stationary inlet so that the corresponding part of the receptacle column is supplied with the fluid sample. The annular chamber is filled with separation material. Carrier gas is introduced into the column spindle and flows upwardly towards the annular column where it mixes with the gas sample.

The gas sample and carrier gas enter the column and proceed downwardly through the packing material and the sample is thereby separated into its components.

The components of the gas sample are received by the stationary valves and passed therethrough for collection.

The aliquot collection tube is preferably connected to detector means. During one complete rotation of the column, a complete chromatogram can be obtained, thus enabling the proper selection of the proper valves required to collect the desired component or components. If desired, the collection tubes emerging from each valve can be connected to a manifold for collection purposes.

The rotation of the column in revolutions per hour is not necessarily a critical feature of the invention. Satisfactory results can be obtained for most work at from about one to sixteen revolutions per hour although faster or slower rates can be obtained by the proper interchange of gears in the rotary drive system.

Examples of suitable carrier gases include helium, hydrogen, nitrogen, argon, air and methane, in addition to steam and carbon dioxide. The packing material can be of the adsorbent type, such as charcoal, alumina, silica gel or a molecular sieve material. Liquid partition columns containing an inert solid coated by a solvent such as hexadecane, octyl sebacate or benzyl ether can also be employed.

What is claimed is:

1. Apparatus for the continuous separation of a fluid mixture into a plurality of constituents comprising:
   a rotatable separating column having an axis, being annular in transverse section and having an inner wall and an outer wall, a suitable packing in said column,
   a rotatable circular guide plate having a peripheral surface in sealed contact with the inner wall of one end of said column thereby to form part of a manifold therefor,
   a rotatable head plate having a surface thereof in circumferential sealed contact with the outer wall of said one end of the column to form a chamber for mixing fluids for passage through the column,
   a column base plate having a surface thereof in circumferential sealed contact with the other end of said column forming an end wall therefor,
   a stationary hollow cylindrical spindle positioned coaxially within said column, said base plate and said guide plate being rotatably and transversely secured to said spindle for permitting rotation of said column about said axis with reduced friction,
   a plurality of circumferentially spaced, axially disposed cylindrical output ports in said base plate for collecting eluted constituents from the column,
   means associated with said base plate for inducing rotation of said column,
   a stationary annular seal plate having a sealing means in sliding contact with said base plate and positioned in coaxial alignment with said output ports, said sealing means having a plurality of circumferentially spaced communicating channels, and
   conduit means for introducing the fluid mixture and a carrier gas through said spindle to said chamber.

2. The apparatus as recited in claim 1 wherein the diameter at least of that portion of the communicating channels adjacent the output ports exceeds that of the output ports, the communicating channels being contiguously positioned to said output ports.

3. The apparatus as recited in claim 1 which includes a collar means rotatably positioned on said spindle for connecting separating column to the interior thereof, the collar means having an interior surface adjacent the periphery of said spindle and a peripheral recess in said surface, said spindle having a port communicating with said recess, thereby to continuously sample all the constituents from said separating column.

4. Apparatus for the continuous separation of a fluid mixture into a plurality of constituents comprising:
   annular receptacle means having a longitudinal axis, an inert separation material disposed in said receptacle means,
   a stationary hollow cylindrical spindle means positioned on said axis for rotatably mounting said receptacle means,
   a rotatable aliquot collection tube connected between the other end of said receptacle means and said spindle means,
   stationary inlet means supplying a sample of the fluid mixture to one end of said receptacle means for separation,
   means transversely disposed relative to said axis and to said spindle for introducing a carrier gas from said spindle into said one end of said receptacle means,
   stationary outlet means transversely disposed relative to said axis for delivering constituents of the fluid and the carrier gas from said receptacle means, said inlet and outlet means being disposed on opposite portions of said receptacle means, said outlet means comprising stationary ring seal means having a plurality of spaced outlet ports positioned concentrically about said axis,
   means operatively connected to said receptacle means and to said rotatable means for continuously rotating said receptacle means and said rotatable means about said axis transversely of said inlet and outlet means whereby the fluid mixture is continuously separated, and a collar means rotatably positioned on said spindle for connecting said collection tube to the interior thereof, the collar means having an interior surface adjacent the periphery of said spindle and a peripheral recess in said surface, said spindle having a port communicating with said recess thereby to continuously sample all of the constituents from said receptacle.

References Cited by the Examiner

UNITED STATES PATENTS

| | | | |
|---|---|---|---|
| 2,891,630 | 6/1959 | Hall et al. | |
| 3,016,106 | 1/1962 | Luft | 55—197 |
| 3,077,103 | 2/1963 | Heaton | 55—197 X |
| 3,187,486 | 6/1965 | Dinelli et al. | 55—67 |

FOREIGN PATENTS

| | | |
|---|---|---|
| 811,627 | 4/1959 | Great Britain. |

REUBEN FRIEDMAN, *Primary Examiner.*

C. N. HART, *Assistant Examiner.*